US008326790B2

(12) United States Patent
Macek et al.

(10) Patent No.: US 8,326,790 B2
(45) Date of Patent: Dec. 4, 2012

(54) FUZZY LOGIC APPROACH IN TEMPORAL FAULT REASONING AND APPLICATION IN AIR HANDLING UNITS

(75) Inventors: Karel Macek, Prague (CZ); Jana Trojanova, Usti nad Labem (CZ); Jiri Rojicek, Prague (CZ)

(73) Assignee: Honeywell International Inc., Morristown, NJ (US)

( * ) Notice: Subject to any disclaimer, the term of this patent is extended or adjusted under 35 U.S.C. 154(b) by 719 days.

(21) Appl. No.: 12/488,315

(22) Filed: Jun. 19, 2009

(65) Prior Publication Data

US 2010/0325488 A1    Dec. 23, 2010

(51) Int. Cl.
G06F 9/44 (2006.01)
G06N 7/02 (2006.01)
G06N 7/06 (2006.01)
(52) U.S. Cl. ......................................................... 706/52
(58) Field of Classification Search ...................... 706/52
See application file for complete search history.

(56) References Cited

U.S. PATENT DOCUMENTS

2005/0021212 A1*    1/2005    Gayme et al. .................. 701/99

OTHER PUBLICATIONS

Demonstrating Automated Fault Detection and Diagnosis Methods in Real Buildings International Energy Agency ESPOO 2001.*
http://www.sciencedirect.com/science?_ob=ArticleURL, "A Rule Based Fault Detection Method for Air Handling Units," Abstract of Article Published in Energy and Buildings, vol. 38, Issue 12, pp. 1485-1492 Dec. 2006.
Korbicz et al., "Application of Fuzzy Logic to Diagnostics," Chapter 11, Fault Diagnosis: Models, Artificial Intelligence, Applications, Springer 2004.

* cited by examiner

Primary Examiner — Omar Fernandez Rivas
Assistant Examiner — Ababacar Seck
(74) Attorney, Agent, or Firm — Seager Tufte & Wickhem LLC.

(57) ABSTRACT

A system that transforms information into fuzzy observable states. These states may be matched against a mapping table which indicates which observable state admits or excludes particular faults. This information may be processed over time when in each time instant the admitted or excluded faults are used for updating the rate for each fault.

20 Claims, 17 Drawing Sheets

Figure 4

| S₁ | S₂ | S₃ | S₄ | S₅ | S₆ | S₇ | S₈ | S₉ |
|---|---|---|---|---|---|---|---|---|
| 0 | 0.3 | 0.7 | 0 | 0 | 0 | 0 | 0 | 0 |

|  | Fault 1 | Fault 2 | Fault 3 | Fault 4 |
|---|---|---|---|---|
| Observable State 1 | 1 | 1 | 0 | 0 |
| Observable State 2 | 0 | -1 | 1 | 1 |
| Observable State 3 | 0 | -1 | -1 | 0 |

Figure 5

|  | Fault 1 | Fault 2 | Fault 3 | Fault 4 |
|---|---|---|---|---|
| Admitting Rate | 0 | 0 | 0.3 | 0.3 |
| Excluding Rate | 0 | 0.7 | 0.7 | 0 |
| Difference Fa | 0 | -0.7 | -0.4 | 0.3 |

| | F1 | F2 | F3 | F4 |
|---|---|---|---|---|
| Previous Fs(t-1) | 10.00 | 8.00 | 15.00 | 12.00 |
| Actual Difference Fa | 0.00 | -0.70 | -0.40 | 0.30 |
| Add with δ=5 | 0.00 | 0.00 | 0.00 | 1.50 |
| Multiply with λ=0.9 | 1.00 | 0.86 | 0.91 | 1.00 |
| New Score Fs(t) | 10.00 | 6.84 | 13.72 | 13.50 |

| | | | | | | Tsa-Tma | | Tsa-Tsas | | Uhc | | Ucc | | | | | |
|---|---|---|---|---|---|---|---|---|---|---|---|---|---|---|---|---|---|
| Name | Tsa v Tma | Tsa v Tsas | Uhc | Ucc | State | l | e | g | l | e | g | l | e | g | l | e | g |
| SH01 | Tsa>Tma | equal | any | - | NORMAL | 0 | 0 | 1 | 0 | 1 | 0 | 0 | 1 | 1 | 1 | 0 | 0 |
| SH02 | Tsa>Tma | below | <1 | - | ABNORMA | 0 | 0 | 1 | 1 | 0 | 0 | 0 | 1 | 0 | 1 | 0 | 0 |
| SH03 | Tsa>Tma | below | 1 | - | ABNORMA | 0 | 0 | 1 | 1 | 0 | 0 | 0 | 0 | 1 | 1 | 0 | 0 |
| SH04 | Tsa>Tma | above | any | - | ABNORMA | 0 | 0 | 1 | 0 | 0 | 1 | 0 | 1 | 1 | 1 | 0 | 0 |
| SH05 | Tsa<Tma | equal | any | - | ABNORMA | 1 | 0 | 0 | 0 | 1 | 0 | 0 | 1 | 1 | 1 | 0 | 0 |
| SH06 | Tsa<Tma | below | <1 | - | ABNORMA | 1 | 0 | 0 | 1 | 0 | 0 | 0 | 1 | 0 | 1 | 0 | 0 |
| SH07 | Tsa<Tma | below | 1 | - | ABNORMA | 1 | 0 | 0 | 1 | 0 | 0 | 0 | 0 | 1 | 1 | 0 | 0 |
| SH08 | Tsa<Tma | above | any | - | ABNORMA | 1 | 0 | 0 | 0 | 0 | 1 | 0 | 1 | 1 | 1 | 0 | 0 |
| SH09 | Tsa=Tma | equal | any | - | ABNORMA | 0 | 1 | 0 | 0 | 1 | 0 | 0 | 1 | 1 | 1 | 0 | 0 |
| SH10 | Tsa=Tma | below | <1 | - | ABNORMA | 0 | 1 | 0 | 1 | 0 | 0 | 0 | 1 | 0 | 1 | 0 | 0 |
| SH11 | Tsa=Tma | below | 1 | - | ABNORMA | 0 | 1 | 0 | 1 | 0 | 0 | 0 | 0 | 1 | 1 | 0 | 0 |
| SH12 | Tsa=Tma | above | any | - | ABNORMA | 0 | 1 | 0 | 0 | 0 | 1 | 0 | 1 | 1 | 1 | 0 | 0 |
| SC01 | Tsa<Tma | equal | - | any | NORMAL | 1 | 0 | 0 | 0 | 1 | 0 | 1 | 0 | 0 | 0 | 1 | 1 |
| SC02 | Tsa<Tma | below | - | any | ABNORMA | 1 | 0 | 0 | 1 | 0 | 0 | 1 | 0 | 0 | 0 | 1 | 1 |
| SC03 | Tsa<Tma | above | - | <1 | ABNORMA | 1 | 0 | 0 | 0 | 0 | 1 | 1 | 0 | 0 | 0 | 1 | 0 |
| SC04 | Tsa<Tma | above | - | 1 | ABNORMA | 1 | 0 | 0 | 0 | 0 | 1 | 1 | 0 | 0 | 0 | 0 | 1 |
| SC05 | Tsa>Tma | equal | - | any | ABNORMA | 0 | 0 | 1 | 0 | 1 | 0 | 1 | 0 | 0 | 0 | 1 | 1 |
| SC06 | Tsa>Tma | above | - | <1 | ABNORMA | 0 | 0 | 1 | 0 | 0 | 1 | 1 | 0 | 0 | 0 | 1 | 0 |
| SC07 | Tsa>Tma | above | - | 1 | ABNORMA | 0 | 0 | 1 | 0 | 0 | 1 | 1 | 0 | 0 | 0 | 0 | 1 |
| SC08 | Tsa>Tma | below | - | any | ABNORMA | 0 | 0 | 1 | 0 | 0 | 0 | 1 | 0 | 0 | 0 | 1 | 1 |
| SC09 | Tsa=Tma | equal | - | any | ABNORMA | 0 | 1 | 0 | 0 | 1 | 0 | 1 | 0 | 0 | 0 | 1 | 1 |
| SC10 | Tsa=Tma | below | - | any | ABNORMA | 0 | 1 | 0 | 1 | 0 | 0 | 1 | 0 | 0 | 0 | 1 | 1 |
| SC11 | Tsa=Tma | above | - | <1 | ABNORMA | 0 | 1 | 0 | 0 | 0 | 1 | 1 | 0 | 0 | 0 | 1 | 0 |
| SC12 | Tsa=Tma | above | - | 1 | ABNORMA | 0 | 1 | 0 | 0 | 0 | 1 | 1 | 0 | 0 | 0 | 0 | 1 |
| SV01 | Tsa=Tma | equal | - | - | NORMAL | 0 | 1 | 0 | 0 | 1 | 0 | 1 | 0 | 0 | 1 | 0 | 0 |
| SV02 | Tsa=Tma | above | - | - | ABNORMA | 0 | 1 | 0 | 0 | 0 | 1 | 1 | 0 | 0 | 1 | 0 | 0 |
| SV03 | Tsa=Tma | below | - | - | ABNORMA | 0 | 1 | 0 | 1 | 0 | 0 | 1 | 0 | 0 | 1 | 0 | 0 |
| SV04 | Tsa<Tma | equal | - | - | ABNORMA | 1 | 0 | 0 | 0 | 1 | 0 | 1 | 0 | 0 | 1 | 0 | 0 |
| SV05 | Tsa<Tma | different | - | - | ABNORMA | 1 | 0 | 0 | 1 | 0 | 1 | 1 | 0 | 0 | 1 | 0 | 0 |
| SV06 | Tsa>Tma | equal | - | - | ABNORMA | 0 | 0 | 1 | 0 | 1 | 0 | 1 | 0 | 0 | 1 | 0 | 0 |
| SV07 | Tsa>Tma | different | - | - | ABNORMA | 0 | 0 | 1 | 1 | 0 | 1 | 1 | 0 | 0 | 1 | 0 | 0 |

*Figure 11*

| | Tsa v Tma | Tsa v Tsas | Uhc | Ucc | F1 | F2 | F3 | F4 | F5 | F6 | F7 | F8 | F9 | F10 | F11 |
|---|---|---|---|---|---|---|---|---|---|---|---|---|---|---|---|
| SH01 | Tsa>Tma | equal | any | - | -1 | 0 | 0 | -1 | -1 | -1 | -1 | 0 | 0 | 0 | -1 |
| SH02 | Tsa>Tma | below | <1 | - | 1 | 0 | 0 | 0 | 0 | 0 | 0 | 0 | 0 | 0 | 0 |
| SH03 | Tsa>Tma | below | 1 | - | 0 | 1 | 1 | 1 | 0 | 0 | 1 | 0 | 0 | 0 | 0 |
| SH04 | Tsa>Tma | above | any | - | 1 | 0 | 0 | 0 | 0 | 0 | 0 | 0 | 0 | 0 | 0 |
| SH05 | Tsa<Tma | equal | any | - | 0 | 1 | 1 | 0 | 0 | -1 | 0 | 0 | 0 | 0 | 0 |
| SH06 | Tsa<Tma | below | <1 | - | 1 | 1 | 1 | 0 | 0 | -1 | 0 | 0 | 0 | 0 | 0 |
| SH07 | Tsa<Tma | below | 1 | - | 0 | 1 | 1 | 1 | 0 | -1 | 1 | 0 | 0 | 0 | 0 |
| SH08 | Tsa<Tma | above | any | - | 1 | 1 | 1 | 0 | 0 | -1 | 0 | 0 | 0 | 0 | 0 |
| SH09 | Tsa=Tma | equal | any | - | 0 | 0 | 0 | 1 | -1 | 0 | 1 | 0 | 0 | 0 | 0 |
| SH10 | Tsa=Tma | below | <1 | - | 1 | 0 | 0 | 0 | -1 | 0 | 0 | 0 | 0 | 0 | 0 |
| SH11 | Tsa=Tma | below | 1 | - | 0 | 0 | 0 | 1 | -1 | 0 | 1 | 0 | 0 | 0 | 0 |
| SH12 | Tsa=Tma | above | any | - | 1 | 0 | 0 | 0 | -1 | 0 | 0 | 0 | 0 | 0 | 0 |
| SC01 | Tsa<Tma | equal | - | any | -1 | -1 | 0 | 0 | 0 | 0 | 0 | 0 | 0 | -1 | 0 |
| SC02 | Tsa<Tma | below | - | any | 1 | 0 | 0 | 0 | 0 | 0 | 0 | 0 | 0 | 0 | 0 |
| SC03 | Tsa<Tma | above | - | <1 | 1 | 0 | 0 | 0 | 0 | 0 | 0 | 0 | 0 | 0 | 0 |
| SC04 | Tsa<Tma | above | - | 1 | 0 | 1 | 0 | 1 | 1 | 1 | 0 | 0 | 0 | 0 | 0 |
| SC05 | Tsa>Tma | equal | - | any | 0 | 0 | 0 | 1 | 1 | 0 | -1 | 0 | 0 | 0 | 0 |
| SC06 | Tsa>Tma | above | - | <1 | 1 | 0 | 0 | 1 | 1 | 0 | -1 | 0 | 0 | 0 | 0 |
| SC07 | Tsa>Tma | above | - | 1 | 0 | 1 | 0 | 1 | 1 | 1 | -1 | 0 | 0 | 0 | 0 |
| SC08 | Tsa>Tma | below | - | any | 1 | 0 | 0 | 1 | 1 | 0 | -1 | 0 | 0 | 0 | 0 |
| SC09 | Tsa=Tma | equal | - | any | 0 | 1 | -1 | 0 | 0 | 1 | 0 | 0 | 0 | 0 | 0 |
| SC10 | Tsa=Tma | below | - | any | 1 | 0 | -1 | 0 | 0 | 0 | 0 | 0 | 0 | 0 | 0 |
| SC11 | Tsa=Tma | above | - | <1 | 1 | 0 | -1 | 0 | 0 | 0 | 0 | 0 | 0 | 0 | 0 |
| SC12 | Tsa=Tma | above | - | 1 | 0 | 1 | -1 | 0 | 0 | 1 | 0 | 0 | 0 | 0 | 0 |
| SV01 | Tsa=Tma | equal | - | - | -1 | 0 | 0 | 0 | 0 | 0 | 0 | 0 | 0 | -1 | -1 |
| SV02 | Tsa=Tma | above | - | - | 1 | 0 | 0 | 0 | 0 | 0 | 0 | 0 | 0 | 0 | 0 |
| SV03 | Tsa=Tma | below | - | - | 1 | 0 | 0 | 0 | 0 | 0 | 0 | 0 | 0 | 0 | 0 |
| SV04 | Tsa<Tma | equal | - | - | 0 | 1 | 1 | 0 | 0 | -1 | 0 | 0 | 0 | 1 | 0 |
| SV05 | Tsa<Tma | different | - | - | 0 | 1 | 1 | 0 | 0 | 0 | 0 | 0 | 0 | 0 | 0 |
| SV06 | Tsa>Tma | equal | - | - | 0 | 0 | 0 | 1 | 1 | 0 | 0 | 0 | 0 | 0 | 1 |
| SV07 | Tsa>Tma | different | - | - | 0 | 0 | 0 | 1 | 1 | 0 | 0 | 0 | 0 | 0 | 0 |

Column headers for F1–F11: F1 Control Strategy Failure, F2 Stuck Cooling Valve, F3 Leaking Cooling Valve, F4 Stuck HEating Valve, F5 Leaking Heating Valve, F6 Cooling Failure, F7 Heating Failure, F8 Stuck Damper, F9 Comm. Failure (Damper), F10 Comm. Failure (Cooling), F11 Comm. Failure (Heating)

*Figure 12*

FUZZY LOGIC APPROACH IN TEMPORAL FAULT REASONING AND APPLICATION IN AIR HANDLING UNITS

BACKGROUND

The present invention pertains to fault detection and diagnostics.

SUMMARY

The invention is an approach that indicates how to aggregate system observations, including fuzzification, occurring over time into a description about faults that are present in the system.

BRIEF DESCRIPTION OF THE DRAWING

FIG. 4 shows an illustrative example of a table indicating values of a vector indicating how a combination of measurements may belong to particular observable states;

FIG. 5 shows an illustrative example of a table which maps faults for observable states;

FIG. 7 shows an illustrative example of a table revealing the admitting and excluding rates for each fault, and a difference between the rates;

FIG. 8 shows an illustrative example of a table revealing an updated fault score based on an aggregation of faults over time;

FIG. 11 shows a table of observable states versus observations of an HVAC system;

FIG. 12 shows a mapping table with observable states listed in rows on the left and faults listed sideways at the top, with results in a grid;

DESCRIPTION

Figure 1:
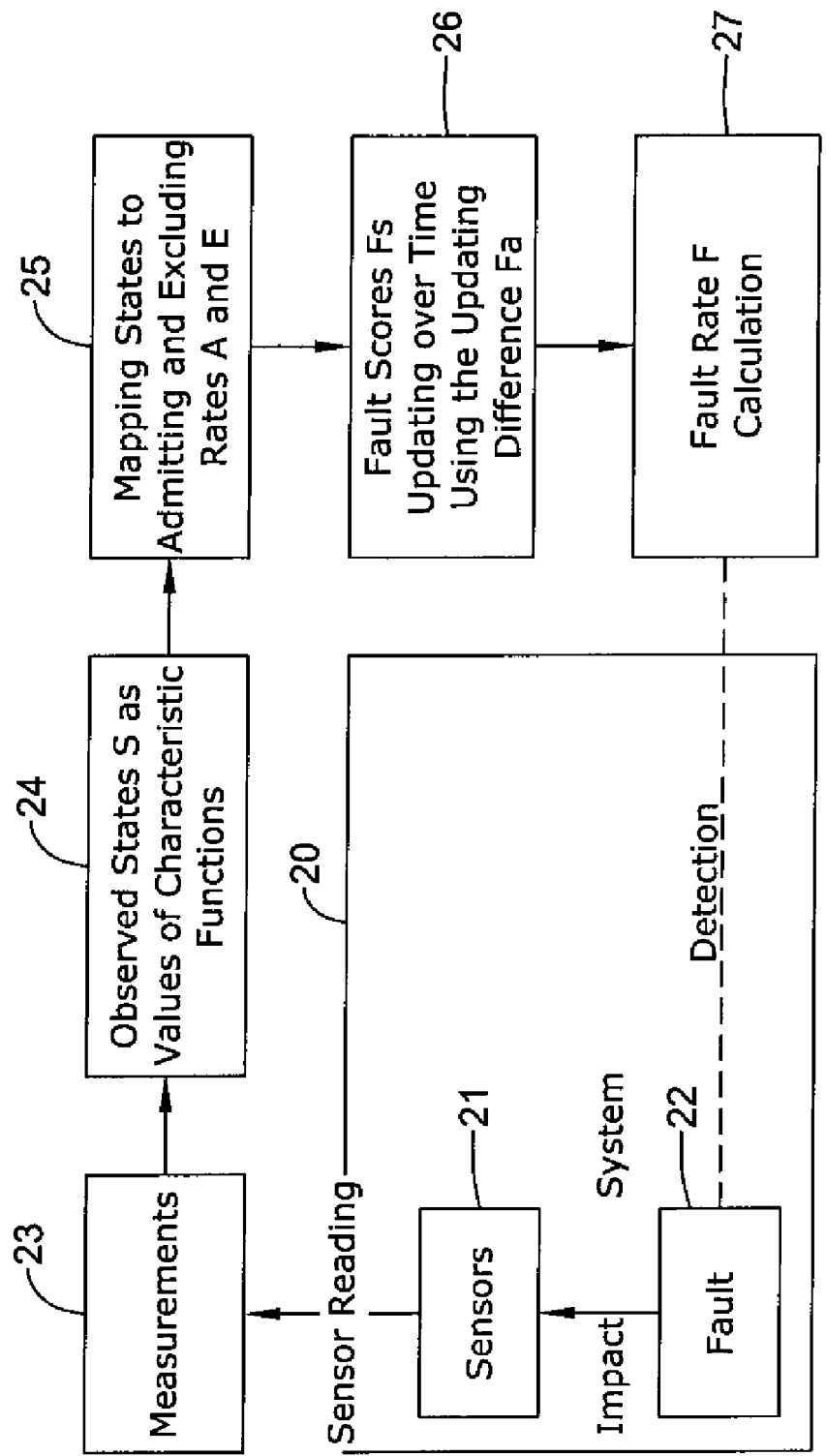
FIG. 1 is a diagram showing an activity about a system from a sensor or sensors to a fault.

In real dynamic systems (i.e., industry, HVAC systems, traffic systems, and so forth), faults can occur. Those faults may remain in the system unobserved, until they cause apparent damage. Early detection of these faults could alert the operator so as to prevent the system from failure. Often, these faults cannot be directly observed. Nevertheless, the system which is subject of the observation has an observable state and the observed state can vary in time depending on various external or internal factors. The goal of fault reasoning is to transform observed states into faults. However, there may not be enough observations for explicit diagnostics. Sometimes faults are hidden and then appear. But in some cases, can be diagnosed only indirectly.

There are two aspects which can make the fault reasoning difficult. First, one specific fault present in the system can be observed in more system states and vice versa. Second, each system state can be explained by more than just one fault. Smart processing of observed states over time can lead to unique fault identification.

The basic idea of the invention consists of following steps. First, sensor readings are transformed into fuzzy observable states. Second, fuzzy observable states are matched against a mapping table that indicates which observable state admits or excludes particular faults. Third, this information may be processed over time when in each time instant the admitted or excluded faults are used for updating the rate for each fault.

The present approach may process the data online and thus does not need access to data history. The mapping table may capture the expert knowledge about the observed system and this information can be stored with transparent semantics. This approach may provide clear interpretation of states fuzzification and fault aggregation.

A feature of the present approach is a fuzzification of observable states, a concept of admitted and excluded faults, a reasoning method, and finally a temporal aggregation with asymmetry in the processing of admitting and excluding information.

The present approach appeared to be inspired by work on automated fault detection and diagnostics for an HBS (home building system) and successfully applied to fault detection for HVAC (heating, cooling, and air conditioning) systems. However, a system, where faults occur and a system observation reflects these faults, may be subject of the present approach.

Before applying fault reasoning, the following procedure should be done manually. Observable states may be defined based on available measurements. The states may represent normal and abnormal behavior of the system. For measurements, relation fuzzy borders may be defined. The mapping table may be constructed based on the expert knowledge of the system. The admitted and excluded faults may be chosen accordingly to observable states, and failures of the system.

The fault aggregation may summarize the history information in just one number. On-line processing is as in the following. The observations may be mapped to faults in each timestamp. The fault score may be updated based on the value of admitted and excluded faults. This number may be normalized versus time. The user may choose the maximal value of a normalization function. When the score reaches this value, the fault rate may equal to 1.

In the present approach, sensor readings may be transformed into fuzzy observable states. The observed states may be mapped to faults. The mapping may find admitting and excluding rates for each fault and each time instant. There may be an aggregation of admitting and excluding fault rates over time to get a fault rate. A kind of aggregation may be also preformed in each time instant, because more states may occur, with respect to actually observed states.

Various terms may have meanings specific to the present approach. "System" may be a group of interacting objects performing one or more functions. "Fault" may be a defect of an object within the system. "Sensor" may be a device for measuring a physical quantity in the system. "Measurement"

may be a value provided by a sensor in a time instant. Combinations of considered measurements may be referred to as a "measurement space". "Observable state" may be a fuzzy subset of the measurement space. Each combination of measurements may pertain to the observable states with the values of fuzzy characteristic functions from [0,1] (i.e., an interval of zero to one) for each state. Observable states may be denoted as "S". "Admitting rate" may be a number from [0,1] expressing how the states S admit a particular fault. A vector of admitting rates for all faults may be denoted as "A". "Excluding rate" may be a number from [0,1] expressing how the states S exclude a particular fault. The vector of excluding rates for all faults may be denoted as "E". "Updating difference" may express a difference between admitting and excluding fault rates. The updating difference may be denoted as "Fa" (Fa=A−E). "Fault score" may be a real positive number. The score may increase if the updating difference Fa is positive and decrease when the updating difference Fa is negative. If Fa equals zero, the score remains unchanged. The vector of the fault score for all faults may be denoted as "Fs". "Fault rate" may be a number from [0,1] expressing how the particular fault is considered as present in the system (detection). The fault rate may be calculated directly from the fault score. The vector for all faults may be called "fault rates F".

In the beginning, there is a fault in the system. Then diagnostics may be performed with respect to measurements. Finally, the fault is detected. FIG. 1 is a diagram showing an activity about a system 20 from a sensor or sensors 21 to a fault 22 and how sensor readings may be used for diagnosing actual faults. One or more sensors 21 may provide one or more sensor readings as measurements 23. Measurements 23 may determine observed states S as values of characteristic functions in block 24. There may be mapping states to admitting and excluding rates A and E, respectfully, in block 25. There may be in block 26 fault scores Fs updating over time using the updating difference Fa. Then in block 27 may be a fault rate F calculation. There be detection of a fault 22. In system 20, fault 22 may have an impact on the sensor or sensors 21.

Measurements 23 may be transformed to fuzzy observable states. First, one may get sensor readings (measurements, typically real numbers). Observable states may be (fuzzy) subsets of the space of measurements. Rules for mapping observable states to faults may be formulated. Preferred splitting may be orthogonal (but not necessarily so). The interpretation may be simple. The subsets borders may be fuzzy. The transition between states should not oscillate. Quantitative information may be transferred and utilized. The result of the transformation may be a "vector S" with values from [0,1] expressing how the actual combination of measurements belongs to particular observable states (i.e., a fuzzy characteristic function).

Figure 2:
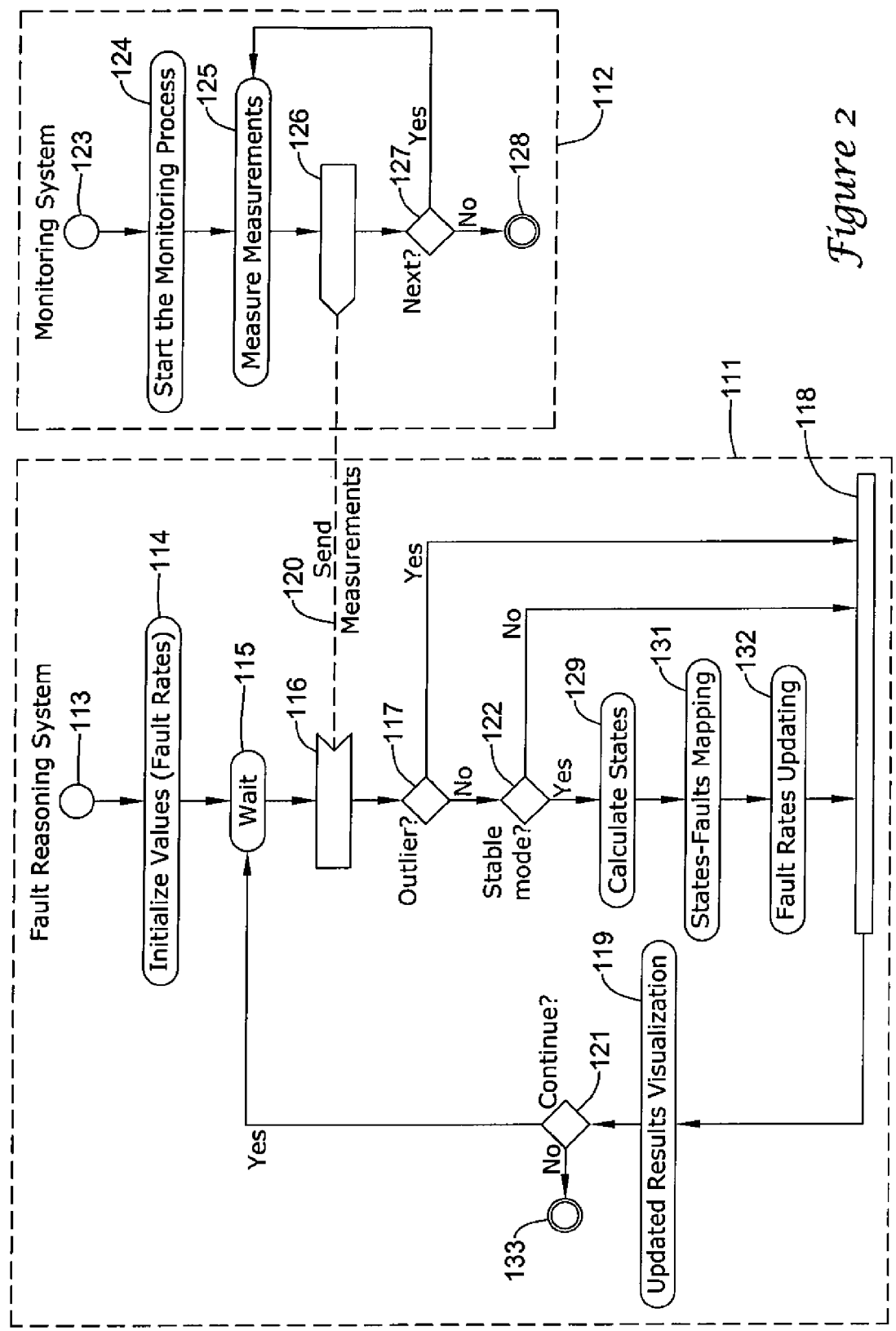
FIG. 2 is an activity diagram showing a fault reasoning system and a monitoring system.

FIG. 2 is an activity diagram showing two systems 111 and 112. System 111 may be regarded as a fault reasoning system. System 111 may be monitored by a system 112 which takes measurements. System 112 may regarded as a monitoring system which is an interface between hardware sensors and the reasoning system 111. The fault reasoning system 111 may be regarded as a system for obtaining the measurements from the monitoring system 112. System 111 may test the relevance of the measurements, i.e., outliers, stability, and so forth. System 111 may calculate state rates, perform mapping, update aggregated fault rates, visualize results, and so on. System 111 may include items 24, 25, 26 and 27 in FIG. 1. System 112 may include items 21 and 23 of FIG. 1.

Fault reasoning system 111 may start at place 113 and proceed on to initialize values (fault rates) at place 114. The system may proceed to a wait place 115. Then it may go to a block 116 that is to "receive measurements". Monitoring system 112 may start at place 123 and go on to a place 124 to start the monitoring process. System 112 may next go to a place 125 to measure measurements. Then it may go to a block 126 that is to send "send measurements". A connection 120 (dashed line) may link block 126 and block 116 each other with "send measurements". System 112 may go on to a symbol 127 asking "Next?" If the answer is yes, the system may return to place 125 to measure measurements and go to block 126 indicating "send no action". Then system 112 may go to symbol 127 asking "Next?" If the answer is yes, the there may be a return to place 125 to again measure measurements. If the answer to the question in symbol 127 is no, then the system 112 may proceed to a place 128 to stop.

After block 116, system 111 may go to symbol 117 to ask the question whether it is an "outlier". If the answer to the question is yes, then system 111 may go to a junction 118 and onto a place 119 for an updated results-visualization. If the answer to the question at symbol 117 is no, then the system may proceed to a symbol 122 to ask a question whether it is a stable mode. If an answer is no, then the system may proceed on to junction 118 and onto place 119 for an updated results visualization. If the answer to the question at symbol 122 is yes, then the system may proceed on to calculate states at place 129, do states-faults mapping at place 131 and fault-rates updating at place 132. From place 132, the system may proceed to junction 118 and onto place 119. System 111 may proceed from place 119 to a symbol 121 asking "Continue?" If an answer to the question is yes, then the system may proceed to the wait place 115 and block 116, and eventually repeat one or more paths of places and symbols 117-119; 117, 122, 118 and 119; and 117, 122, 129, 131, 132, 118 and 119. If the answer to the question "Continue?" at symbol 121 is no, then the system may proceed to a place 133 to stop.

Figure 3:
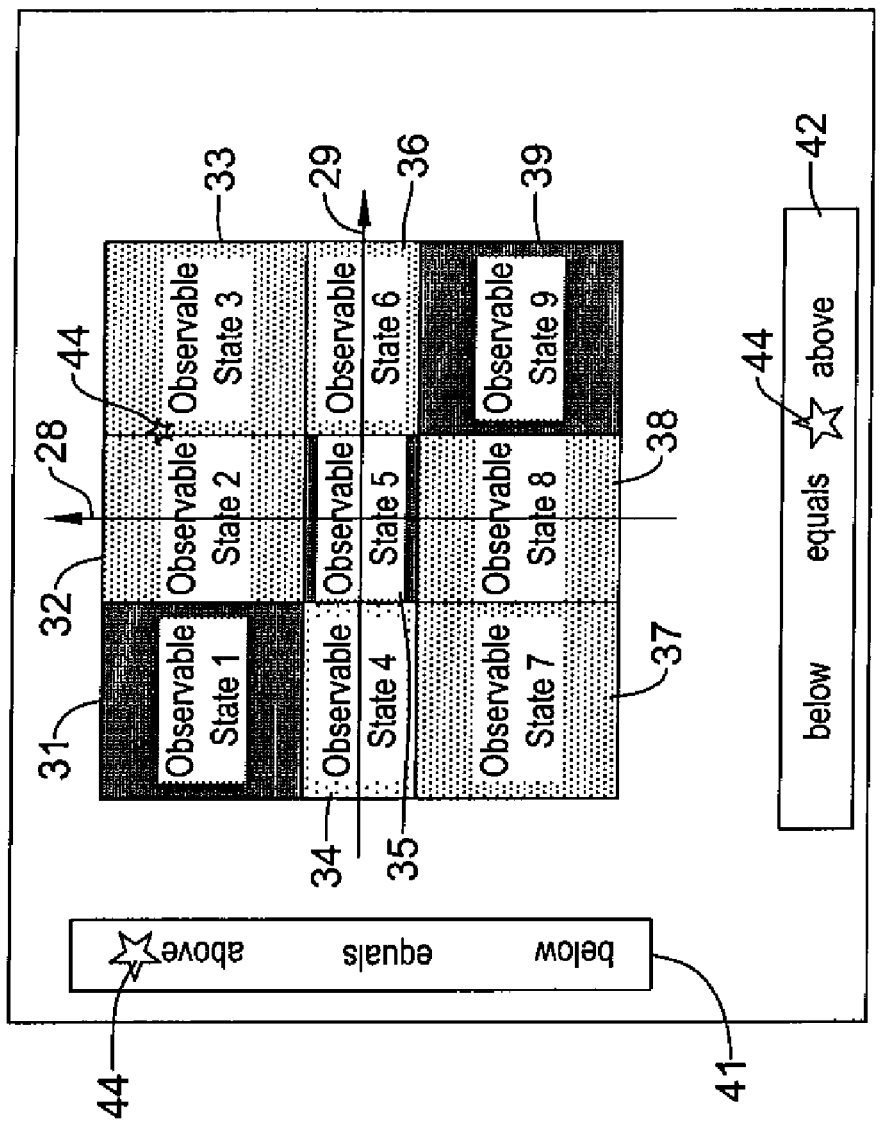
FIG. 3 is a diagram of an illustrative example of a transformation of measurements and observable states may be subsets of the space of measurements.
Figure 4:
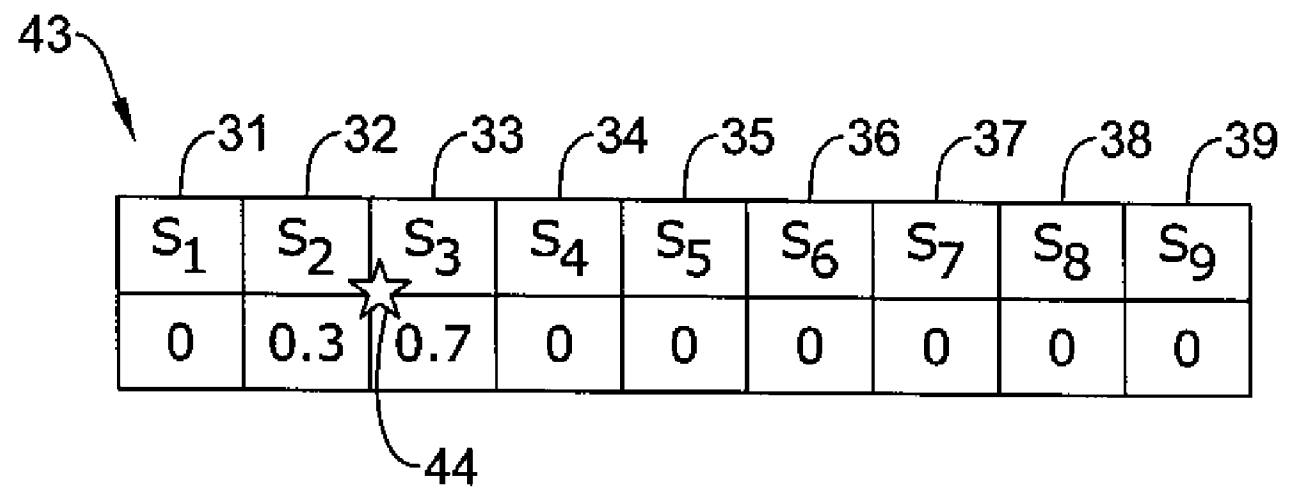
Figure 9:
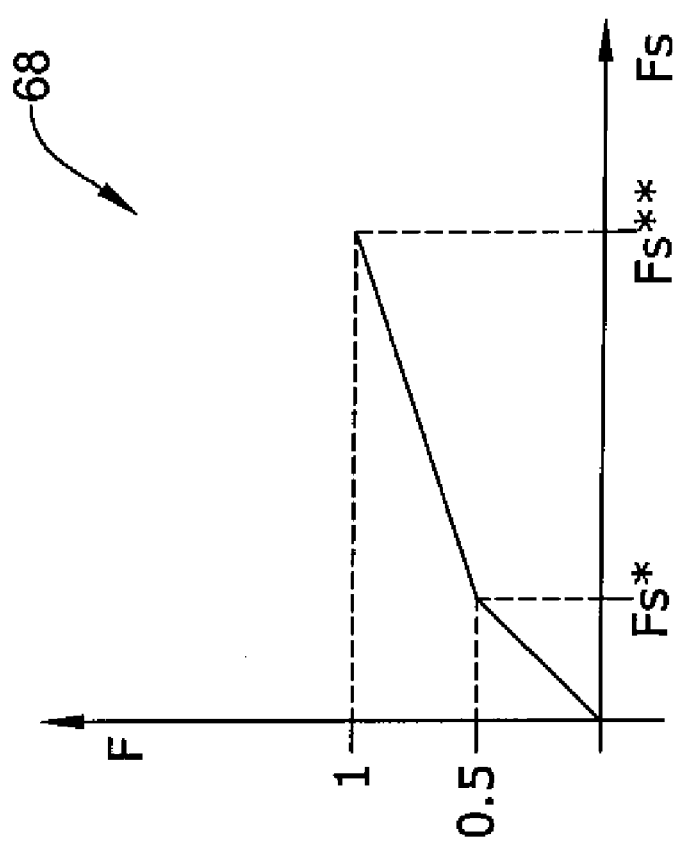
FIG. 9 shows an illustrative example of a graph illustrating a transformation of a fault score by a piecewise linear function.
Figure 10:
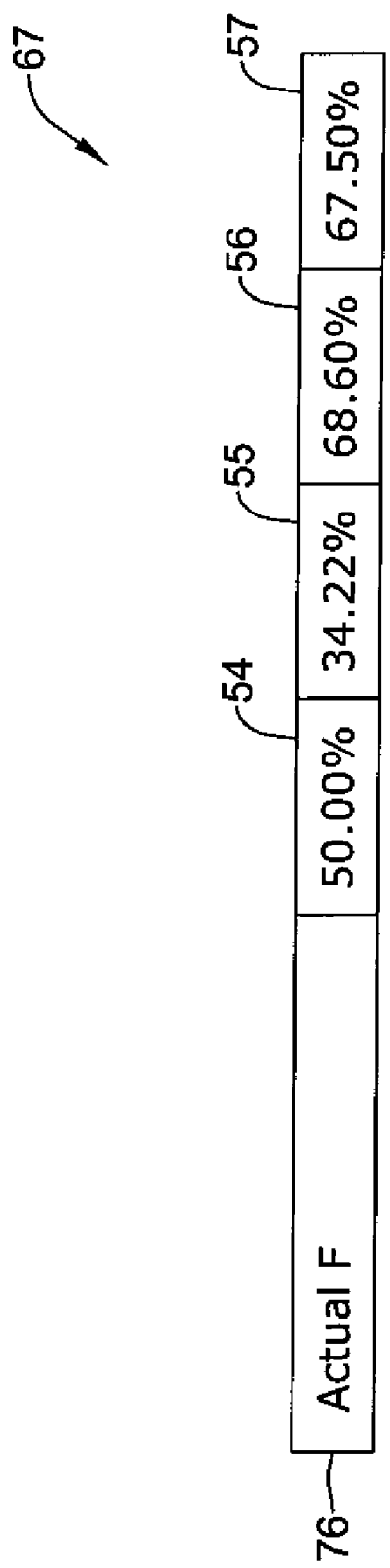
FIG. 10 shows an illustrative example of a table indicate an actual fault rate for the faults in the table of FIG. 8.

The calculation of states at place 129 may be shown in more detail in a description of FIGS. 3 and 4. The states-faults mapping at place 131 may be shown in more detail in a description of FIGS. 5 through 7. The fault rates updating may be shown in more detail in a description of FIGS. 8 through 10.

FIG. 3 is a diagram of an illustrative example transformation of measurements 1 and 2, indicated by arrow-ended lines 28 and 29, respectively. Observable states 1, 2, 3, 4, 5, 6, 7, 8 and 9, which are represented by blocks 31, 32, 33, 34, 35, 36, 37, 38 and 39, may be subsets of the space of measurements. The borders between the subsets are may be fuzzy. Bars 41 and 42 indicate strengths of measurements 28 and 29, respectively. The value of strength of a measurement relative to an observable state may vary between 0 and 1. A vector S has values indicating how a combination of measurements 41 and 42 may belong to particular observable states. These values are shown in table 43 of FIG. 4. A star symbol 44 indicates where the vector of measured values 28 and 29 may be situated relative to the states 31-39. Values of the state rates 32 and 33 may be 0.3 relative to state 2 and 0.7 relative to state 3.

Faults, such as the admitting and excluding faults, may be mapped. For each observable state, some faults may be admitted and some faults may be excluded. The relation may be expressed as a mapping table 45 shown in FIG. 5, where −1 stands for excluded, and 1 stands for admitted faults. Faults that are neither admitted nor excluded may be expressed as 0. Mapping table 45 may capture the expert knowledge and should be known in advance. Observable state 1 in block 51 has admitted faults 1 and 2 of blocks 54 and 55, respectively, and faults 3 and 4 of blocks 56 and 57, respectively, that are neither admitted nor excluded. Observable state 2 in block 52 has admitted faults 3 and 4 of blocks 56 and 57, respectively, fault 1 of block 51 that is neither admitted nor excluded, and excluded fault of block 55. Observable state 3 in block 53 has excluded faults 2 and 3 of blocks 55 and 56, respectively, and faults 1 and 4 which are neither admitted nor excluded in blocks 54 and 57, respectively.

Figure 6:
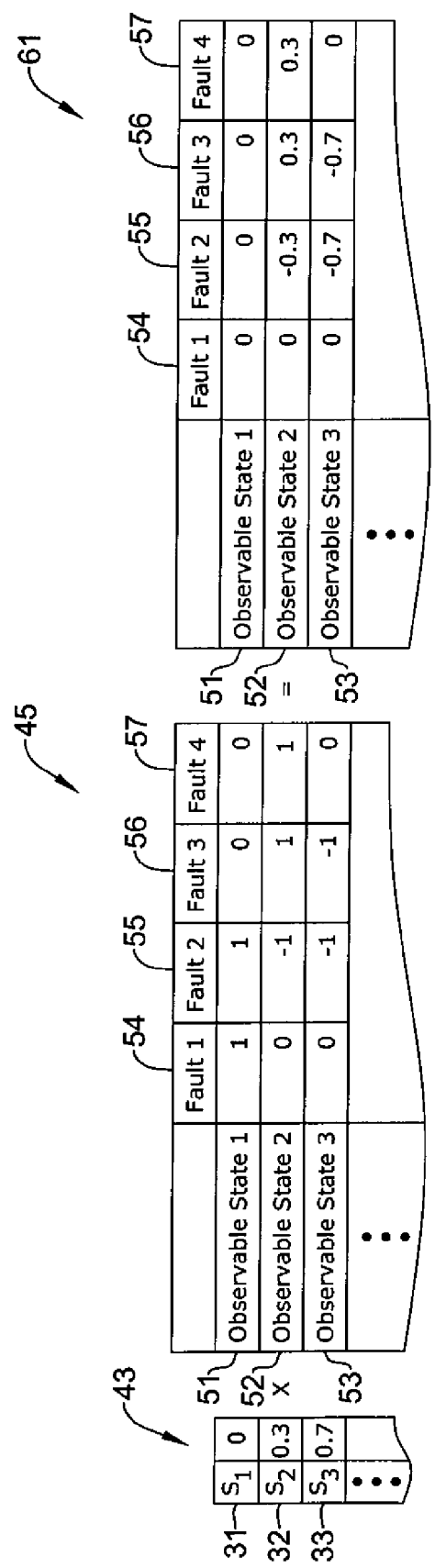
FIG. 6 shows an illustrative example of a mapping table multiplied by the values of vector equaling a product which is table expressing how the faults are admitted and excluded by observable states with respect to the vector.

The faults may be mapped. An algorithm may be put forth for mapping. A mapping table and a vector of observed states S may be given. The mapping table rows may be multiplied by corresponding values from the vector of observed states S. The result is a table 61 expressing how the faults are admitted and excluded by observable states with respect to S. FIG. 6 shows mapping table 45 of FIG. 5 multiplied by the vector S 43 of FIG. 4 to equal a product which is table 61. The multiplication result 61 may result in zeros for faults 1-4 in columns 54, 55, 56 and 57, for observable state 1 in row 51, in zero, −0.3, 0.3 and 0.3 for faults 1-4, respectively, of observable state 2 in row 52, and in zero, −0.7, −0.7 and zero for faults 1-4, respectively, of observable state 3 in row 53.

In FIG. 7, for each fault, the admitting rate in row 63 and the excluding rate in row 64 are calculated as a maximal positive and minimal negative value in the column corresponding to given fault. The admitting rates for faults 1-4 are 0, 0, 0.3 and 0.3, respectively, in row 63. The excluding rates for faults 1-4 are 0, 0.7, 0.7 and 0, respectively, in row 64. A difference Fa between the admitting and excluding rates may be calculated for faults 1-4 to result in 0, −0.7, −0.4 and 0.3, respectively, as indicated in row 65 of table 62.

There may be an aggregation over time. Each fault may have a non negative score Fs where the initial value is 0 for all faults and is updated in each time step with respect to Fa. If the value Fa is positive, the coefficient δ multiplied by Fa may be added to the score. If the value Fa is negative, the score may be multiplied by the coefficient λ powered by |Fa|. An application of the approach may be shown in table 66 of FIG. 8. In row 71, previous Fs(t−1) values for faults 1-4 may be 10.00, 8.00, 15.00 and 12.00, respectively, in columns 54-57. In row 72, the actual difference Fa for faults 1-4 may be 0.00, −0.70, −0.40 and 0.30, respectively, in columns 54, 55, 56 and 57. In row 73, for positive Fa, the score may be added to with the coefficient δ=5 and multiplied by Fa for faults 1-4 to result in 0.00, 0.00, 0.00 and 1.5, respectively, in columns 54, 55, 56 and 57. In row 74, for negative Fa, the score may be multiplied by the coefficient λ=0.9 powered by |Fa| for faults 1-4 to result in 1.00, 0.86, 0.91 and 1.00, respectively, in columns 54, 55, 56 and 57. In row 75, the new score Fs(t) for faults 1-4 may be 10.00, 6.84, 13.72 and 13.50, respectively, in columns 54, 55, 56 and 57.

The updating asymmetry may be motivated. If there is any reason to admit the fault with low score, the score may increase fast. If there is any reason to exclude the fault with high score, the score may decrease fast. This score may be transformed by a piecewise linear function so the fault rate F is from the interval [0,1] as shown in graph 68 of FIG. 9. The graph shows fault rate F versus fault score. A row 76 in table 67 of FIG. 10 may indicate the actual F rate for the faults 1-4. "Actual F" may be 50.00 percent, 34.22 percent, 68.60 percent and 67.50 percent for faults 1, 2, 3 and 4, respectively of columns 54, 55, 56 and 57.

The present method may be employed as in the following. One may enumerate considered faults. One may define observable states and necessary measurements determinate them, consider suitable fuzzification of borders. One may determine the admitted and excluded faults for all observable states, and write them into the mapping table. One may assess parameters δ, λ, Fs*, Fs. One may determine how many admitting successive time steps are necessary so the fault rate increases from 0% to 50% and how many from 50% to 100%. One may determine how many excluding successive time steps are necessary to decrease the fault rate from 100% to 0%.

There may be motivation for employing the present methodology. There may be considered faults, observable states and measurements. Fuzzy observable states may be determined from measurements. There may be a mapping table. Aggregation parameters may be set up. The method may be applied to simulated data and real data.

Motivation for the present approach may be provided by various factors. For instance, an HVAC system is complex, not fully observable and breakable in time. Important aspects may include energy costs and residents' comfort. Related concepts may include expert knowledge, results of others (APAR rules, and the like), and a HVAC Simulink™ model.

Faults, observable states and measurements may be noted. Measured values may include temperatures Tsa, Tma and Tsas. Tsa may be supply air temperature, Tma may be mixed air temperature, and Tsas may be a supply air temperature setpoint. Also, control signals such as Uhc and Ucc may be included. Uhc may be a heating valve control signal and Ucc may be a cooling coil valve control signal. Thirty one disjunctive observable states may be considered and determined from measured values. The number could be more or less. The observable states are listed in the left column 82 of table 81 in FIG. 11. Faults may include, for example, control strategy failure, stuck cooling valve, leaking cooling valve, stuck heating valve, leaking heating valve, cooling failure, heating failure, stuck damper, comm. failure (damper), comm. failure (cooling), comm. failure (heating), fan failure, and so on.

Table 81 defines the states from measurements. Each row may contain this information twice, once in formulas (left) and once in coding which condition has to be satisfied for a value. "l" means less, "e" means equals and "g" means greater. Table 81 does not necessarily provide any information on faults. This information may be given in table 84. Observations for faults listed in left column 82 may be shown in a row 83 for the columns to the right of column 82 of table 81. Information about a fault in column 82 may be indicated to the right in the same row of the fault. Fuzzy observable states may be drawn from measurements. There may be a splitting the measurement space. The splitting may include temperature differences Tsa−Tsas and Tsa−Tma, representing below zero, around zero, and above zero. Also, control signals Uhc and Ucc representing zero, some, and one may be included.

Fuzzy borders may include temperature differences in which ±0.5° C. is 100% around zero, >3° C. is 100% above zero, <−3° C. is 100% below zero. A control signal from [0.1, 0.9] may be considered as "some".

FIG. 12 shows a mapping table 84 with observable states listed in rows 85 and faults 86 listed sideways at the top above rows 85, with results in a grid of intersections of the respective observable states and faults. Mapping table 84 may be based on expert knowledge and inspired by APAR rules and other methodologies. The mapping table may be reviewed with respect to particular data sets (real and/or simulated).

Figure 13:
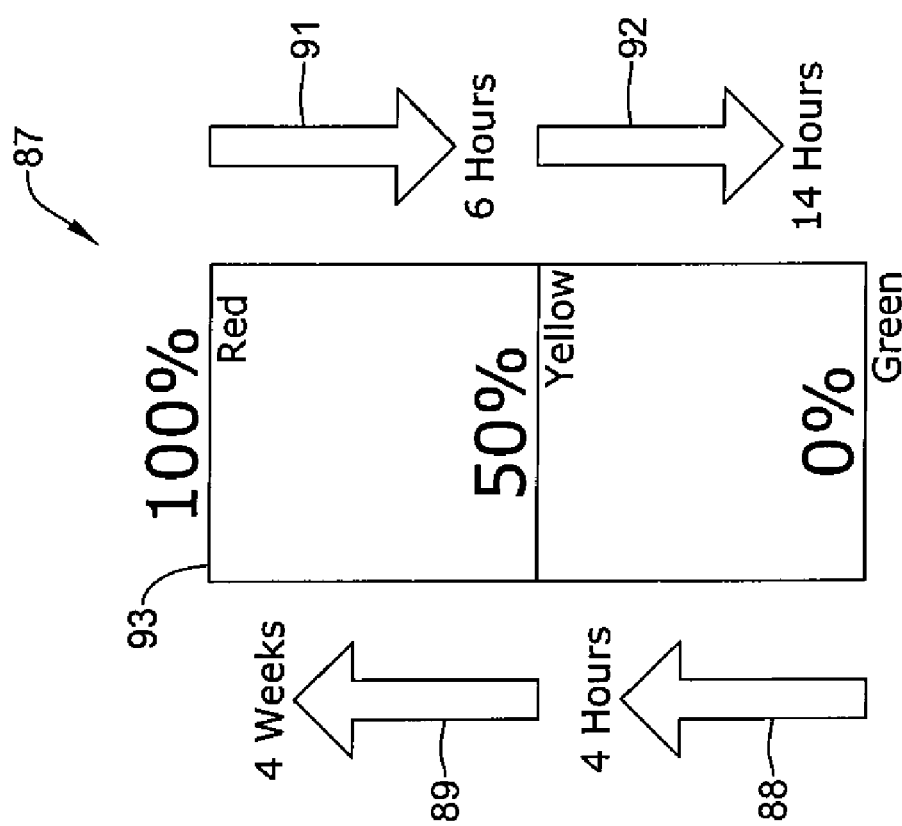
FIG. 13 shows a bar graph of fault rate as constructed from aggregation parameters.

Aggregation parameters may be set up as illustrated by a graph 87 in FIG. 13. Relative to a bar graph 93, a fault rate may be at 50% if the fault was admitted 4 hours without interruption, as indicated by arrow 88. A fault rate may be at 100% if the fault was admitted effectively 4 weeks without interruption, as indicated by arrow 89. The fault rate may be at 50% if the fault was excluded 6 hours as indicated by arrow 91. The fault rate may be at 0% if the fault was excluded 20 hours as indicated by arrows 91 and 92. The values for fault rates may be set up with respect to particular system. Bar graph 87 could have shading that varies from green at zero percent to yellow at 50 percent. There could be shading in graph 87 which varies from red at 100 percent to yellow at 50 percent.

The present approach may be applied to simulated data. The data may be an output from a Simulink™ model of an HVAC system. The fault may be introduced into the model as a special block in the particular device; therefore the fault would be known. The simulation may be performed as usual and data (measurements) be obtained. Results may be calculated for each time step and visualized. Results of such simulation would be generally good.

Figure 14:
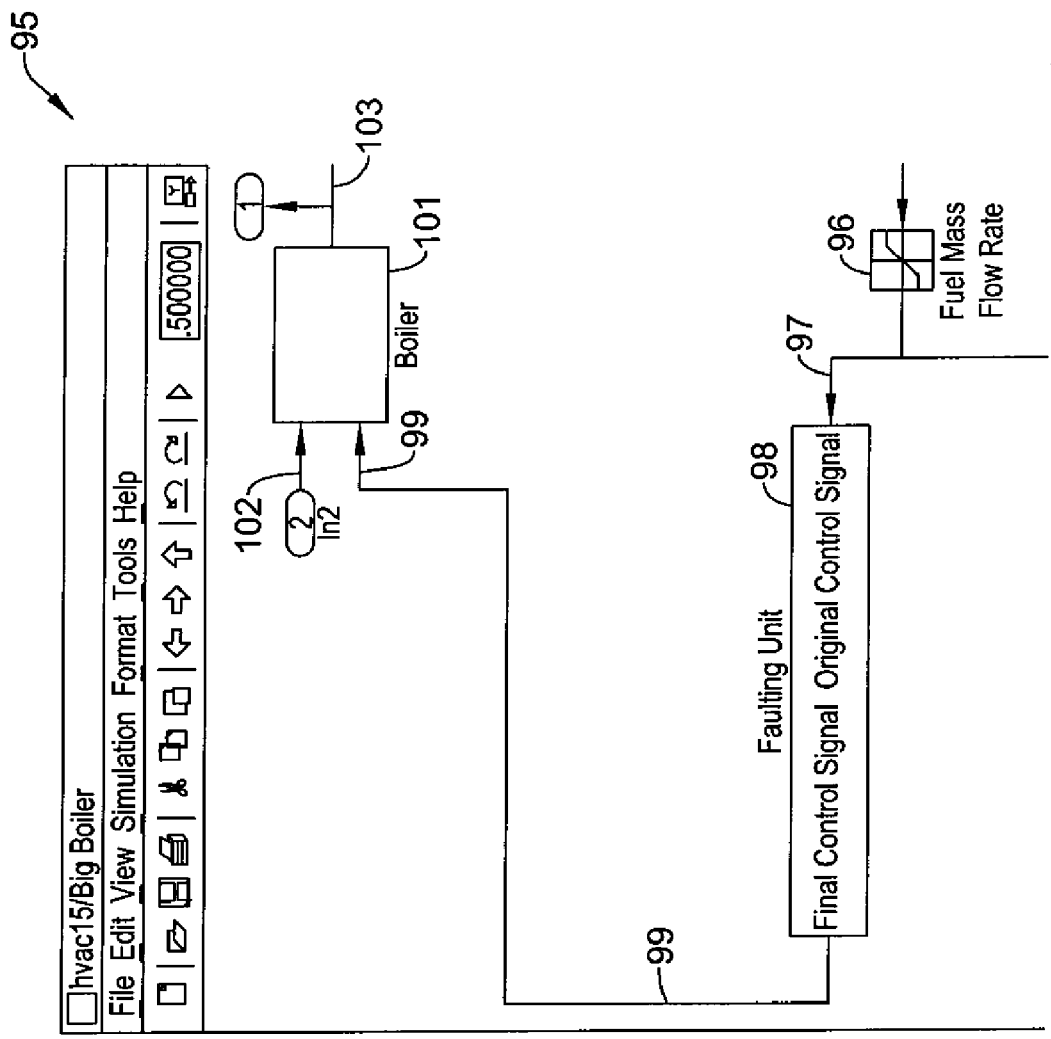
FIG. 14 is a diagram of a screen print of a display for a simulation of the present approach as applied to a boiler.

FIG. 14 shows a screen print 95 of a display that may appear for a simulation of the present approach. A Simulink™ framework may be used here. A mass fuel flow rate 96 may be applied with an original control signal 97 to a faulting unit 98 shown in the display. An output from faulting unit 98 may be a final control signal 99 to an input of a boiler 101 shown in the display. A water input signal 102 may go to boiler 101. A water output signal 103 may proceed from boiler 101.

Figure 15:
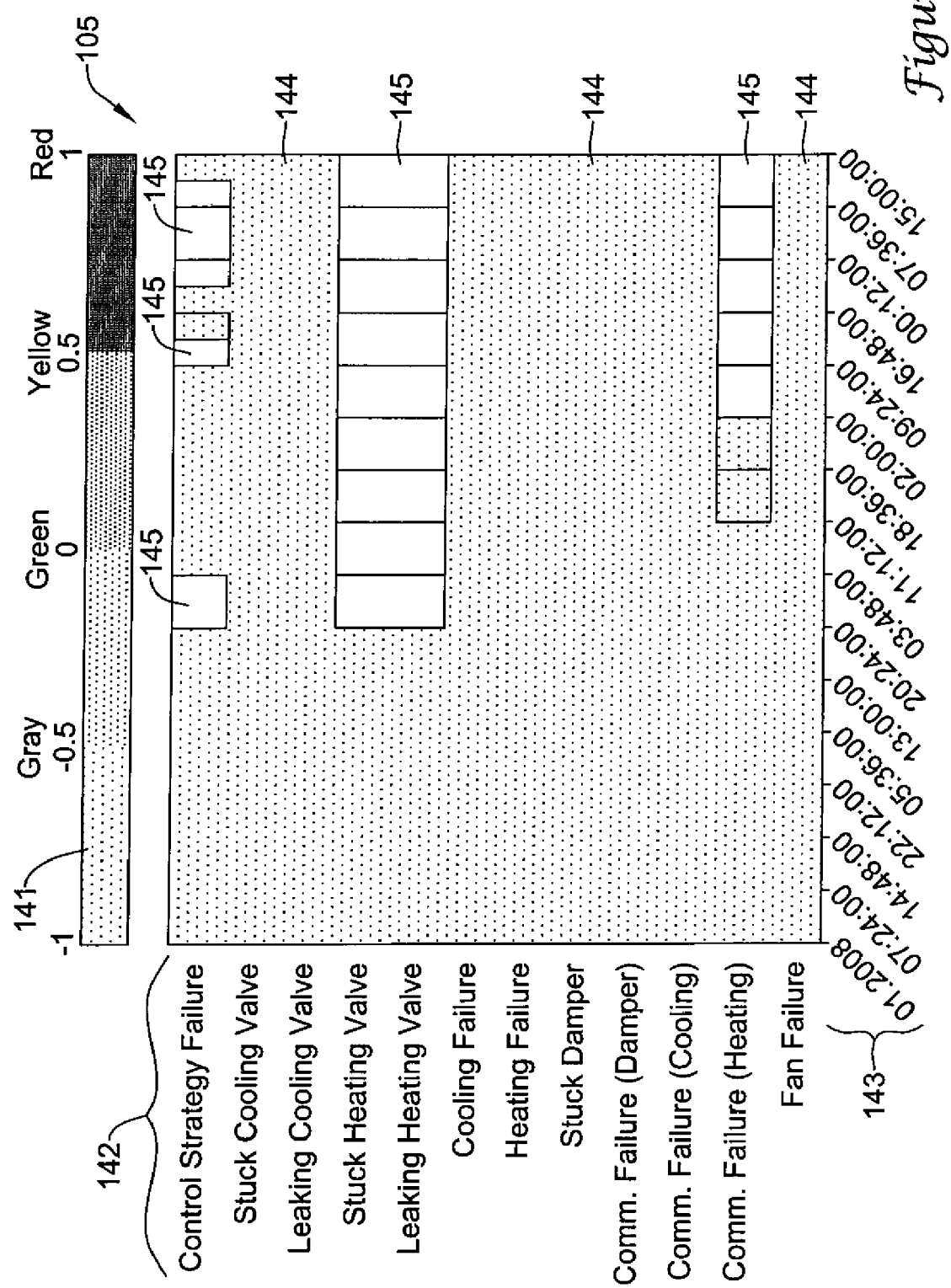
FIGS. 15, 16 and 17 show graphs of failures versus time with fault rate indicated on a grid by shading for several instances of an HVAC simulation in a building automation system.

FIG. 15 shows a graph 105 with a plot of data from a simulation. The graph may have shading indicating fault rate data in accordance with a scale in FIG. 13. A shaded bar 141 at the top of graph 105 is grey from −1 through −0.5 to zero. Bar could be regarded as green at zero and gradually vary in color to yellow at +0.5. The bar could be regarded as red at +1 and gradually vary in color to yellow at +0.5. Graph 105 may list various faults or failures at the left portion 142 of the graph with times (e.g., timestamps) listed at the bottom portion 143 from left to right. Potential failures or faults may include, for examples, control strategy failure, stuck cooling valve, leaking cooling valve, stuck heating valve, leaking heating valve, cooling failure, heating failure, stuck damper, comm. failure (damper), comm. failure (cooling), comm. failure (heating), fan failure, and so on. Most of the area 144 of graph 105 could be green (i.e., larger darker areas) indicating no or a low fault rate for the various components listed. Areas 145 could be non-green, e.g., yellow-green, yellow, orange, red-orange, or the like, to indicate worse than a no or low-fault rate for certain components at particular times. For example, the stuck and leaking heating valve in graphs 105 and 147 shows other than green for a major portion of the graph to the right in area 145 indicating a greater fault rate. Similarly for the leaking cooling valve in graph 148, area 145 indicates also a greater than fault rate.

Figure 16:
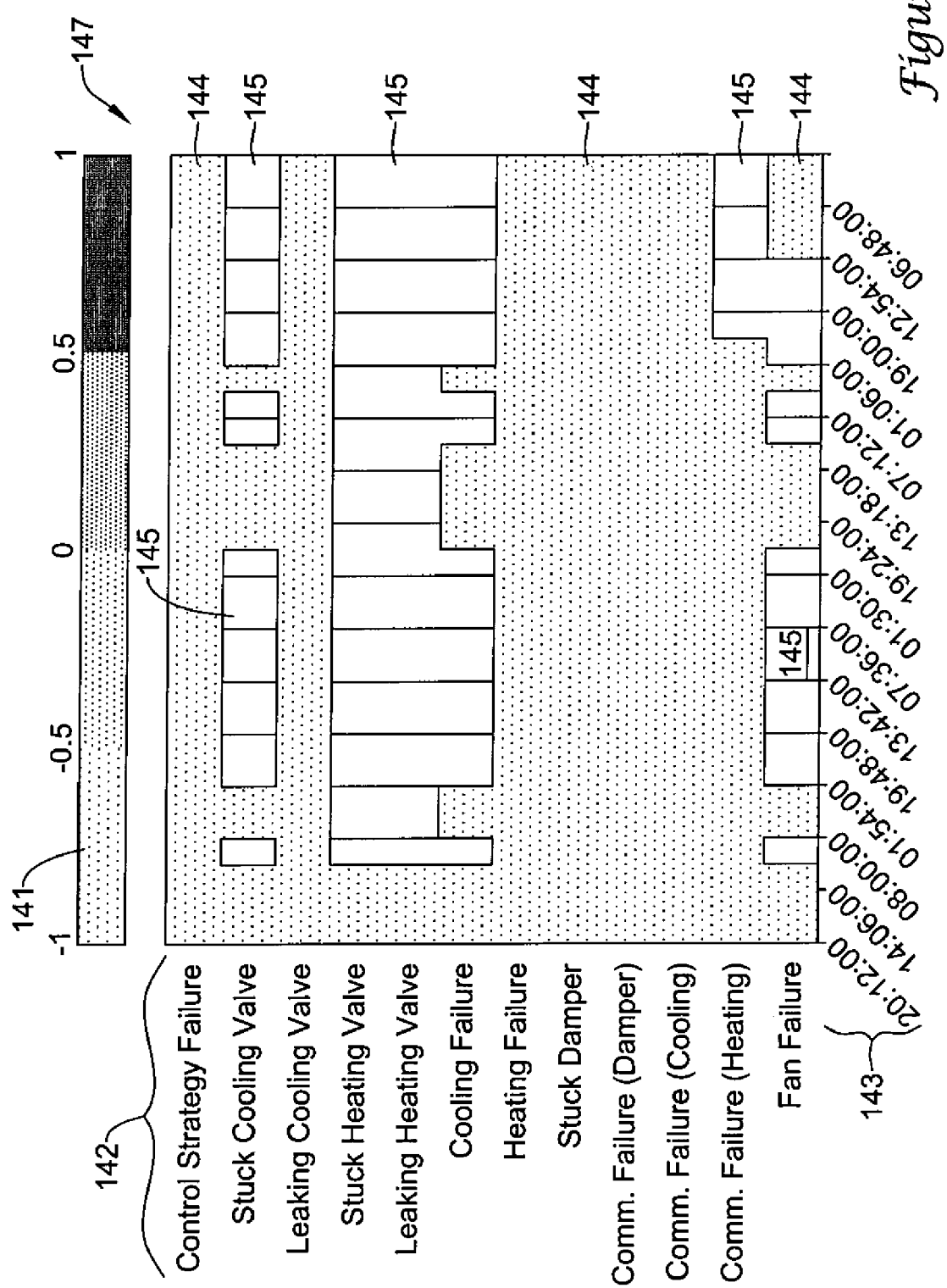
Figure 17:
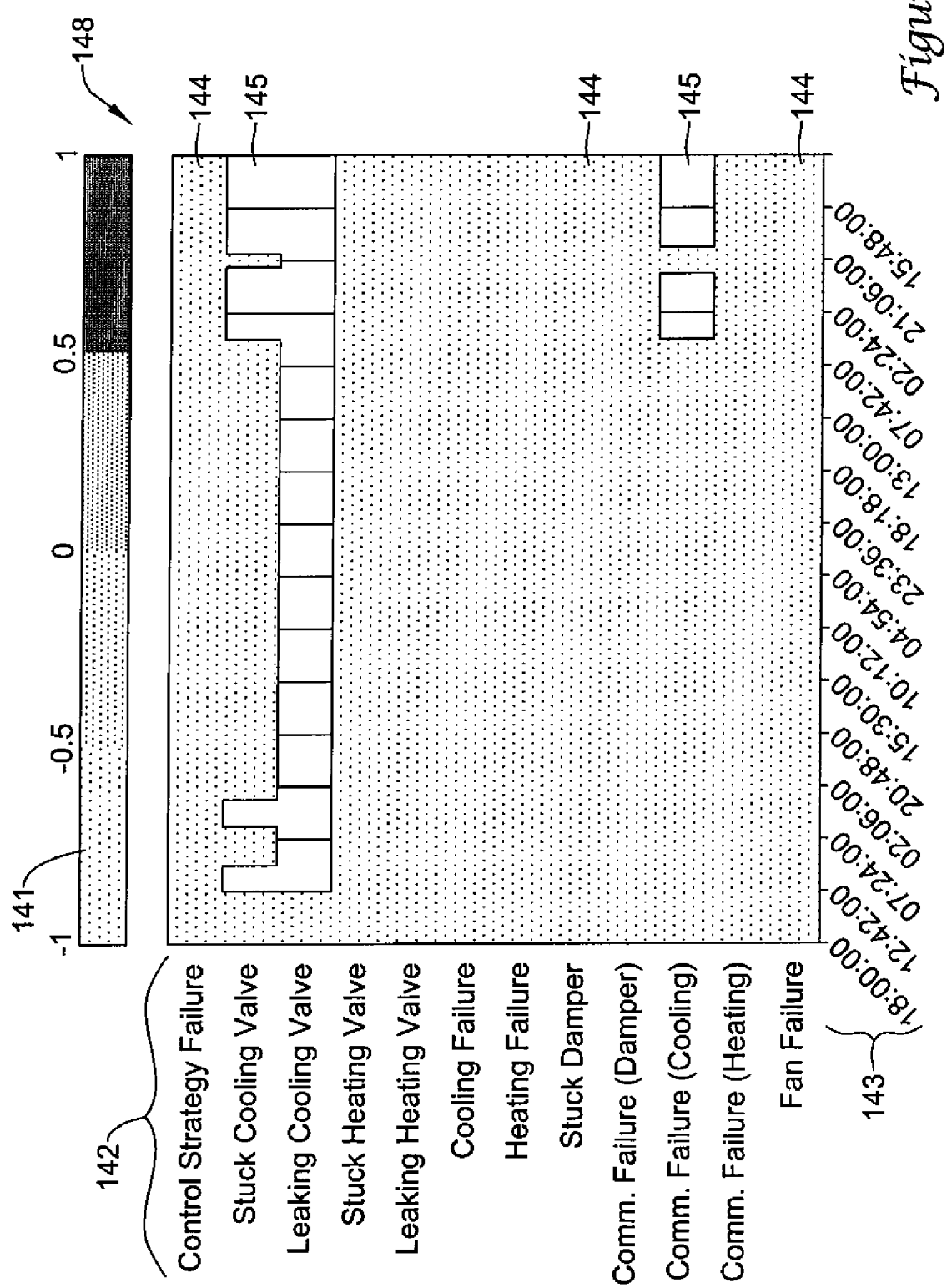

The present approach and system may be applied to real data from actual buildings. The maintenance team of the respective buildings provided information on expected faults. The present approach and system seemed able to detect the faults. Results were calculated for each time step and visualized. The performance of the system for detection and diagnoses of faults appeared to be good. FIGS. 16 and 17 shows graphs 147 and 148 revealing results of data of the present approach and system. Like FIG. 15, the potential failures or faults may be listed at the left column 142 with times listed at the bottom row 143 from left to right of graphs 147 and 148. Most of the areas 144 of graphs 147 and 148 could be green (i.e., larger darker areas in the Figure) indicating no or a low fault rate for the various components listed. Areas 145 could be non-green, e.g., yellow-green, yellow, orange, red-orange, or the like, to indicate worse than a no or low-fault rate for certain components at particular times.

The present approach and system may be set up to encompass temporal fuzzy fault reasoning for setting up parameters and formulating mapping tables. The reasoning approach has been and may be applied to data simulated by a Simulink™ HVAC model and data from real buildings. The approach and system may properly diagnose existing faults in an HVAC or other building control system.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A method for fault reasoning comprising:
   obtaining sensor readings of a building control system;
   transforming sensor readings into a vector of fuzzy observable states;
   matching each of the fuzzy observable states against states in a table listing observable states that admit particular faults and observable states that exclude particular faults; and
   performing reasoning on outputs of the matching including determining a number of admitting successive time steps needed to increase a fault rate from a first percent to a second percent;
   wherein transforming measurements to a vector of fuzzy observable states is expressed as a vector S with values from an interval of zero to one indicating how a combination of measurements belongs to particular observable states;
   a mapping of table has rows which are multiplied by corresponding values from the vector S to result in a table indicating how faults are admitted and excluded by observable states relative to vector S;
   for each fault, admitting and excluding rates are calculated as maximal positive and minimal negative values, respectively; and
   a difference Fa between the admitting and excluding rates is calculated for each fault.

2. The method of claim 1, wherein the table is updated relative to observable states which admit or exclude faults.

3. The method of claim 2, wherein a fuzzification of observable states comprises admitted and excluded faults.

4. The method of claim 3, wherein observable states are based on measurements.

5. The method of claim 4, wherein observable states represent normal and abnormal behaviors of the system.

6. The method of claim 5, further comprising aggregating admitting fault rates over time and an excluding fault rates over time to obtain a fault rate.

7. A fault reasoning system comprising:
   one or more sensors;
   a display;
   a monitoring system coupled to the one or more sensors, for monitoring measurements obtained from the one or more sensors; and
   wherein a fault reasoning system is configured for:
   initializing fault rate values;
   obtaining measurements via the monitoring system;
   calculating state rates;
   mapping of state faults;
   aggregating fault rates over time;
   updating aggregated fault rates; and
   visualizing results on the display; and wherein the calculating state rates comprises:
mapping observable states to faults wherein the observable states are subsets of space measurements and the subsets have fuzzy borders; and
transforming state measurements to a vector of fuzzy observable states for determining an admitting rate and an excluding rate for each fault;
wherein transforming measurements to a vector of fuzzy observable states is expressed as a vector S with values from an interval of zero to one indicating how a combination of measurements belongs to particular observable states;
a mapping of table has rows which are multiplied by corresponding values from the vector S to result in a table indicating how faults are admitted and excluded by observable states relative to vector S;
for each fault, admitting and excluding rates are calculated as maximal positive and minimal negative values, respectively; and
a difference Fa between the admitting and excluding rates is calculated for each fault.

8. The system of claim 7, wherein the mapping of state faults contains some admitted faults, some excluded faults, and/or neither admitted nor excluded faults for each observable state.

9. The system of claim 8, further comprising applying a mapping algorithm to the mapping of state faults.

10. The system of claim 9, wherein the mapping algorithm comprises:
wherein the transforming measurements to a vector of fuzzy observable states is expressed as a vector S with values from an interval of zero to one indicating how a combination of measurements belongs to particular observable states;
the mapping of table has rows which are multiplied by corresponding values from the vector S to result in a table indicating how faults are admitted and excluded by observable states relative to vector S;
for each fault, admitting and excluding rates are calculated as maximal positive and minimal negative values, respectively; and
a difference Fa between the admitting and excluding rates is calculated for each fault.

11. The system of claim 10, wherein the updating aggregated fault rates comprises:
noting a previous value of each fault;
updating the value for each fault in each time step with respect to Fa;
if Fa is positive, add to the score a coefficient $\delta$ multiplied by Fa to get an updated value; and
if Fa is negative, multiply the score by a coefficient $\lambda$ powered by |Fa| to get an updated value.

12. The system of claim 11, wherein:
the coefficient $\delta$ is equal to a first value; and
the coefficient $\lambda$ is equal to second value.

13. The system of claim 7, further comprising:
determining a number of admitting successive time steps needed to increase a fault rate from A percent to B percent;
determining a number of admitting successive time steps needed to increase a fault rate from B percent to C percent; and/or
determining a number of excluding successive time steps needed to decrease a fault rate from C percent to A percent.

14. The system of claim 7,
wherein:
the monitoring system obtains measurements; and
the monitoring system feeds the measurements to the fault reasoning system.

15. A mechanism for fault reasoning comprising:
a monitoring system comprising one or more sensors; and
wherein:
the one or more sensors provide measurements of physical quantities in a system;
the system is a group of interacting objects for performing one or more functions;
a fault is a defect of an object in the system;
a fault rate is a number which indicates how the fault is considered present in the system, wherein the fault rate is calculated using a fault score and wherein the fault score is updated over time with an updating difference;
the updating difference indicates a difference between an admitting fault rate and an excluding fault rate; and
a fault score is a real positive number that increases if the updating difference is positive, decreases if the updating difference is negative, and is unchanged if the updating difference is zero.

16. The mechanism of claim 15, further comprising:
observable states as values of characteristic functions; and
wherein:
a measurement is a value provided by a sensor at a particular time;
combinations of measurements are a measurement space; and
an observable state is a fuzzy subset of the measurement space.

17. The mechanism of claim 16, wherein each combination of measurements pertains to observable states having values of characteristic functions from an interval of zero to one for each state.

18. The mechanism of claim 17, further comprising:
mapped states to admitting and excluding rates; and
wherein:
an admitting rate is a number from an interval of zero to one indicating how observable states admit a particular fault; and
an excluding rate is a number from an interval of zero to one indicating how observable states exclude a particular fault.

19. The mechanism of claim 18, wherein:
the updating difference indicates a difference between an admitting fault rate and an excluding fault rate; and
a fault score is a real positive number that increases if the updating difference is positive, decreases if the updating difference is negative, and is unchanged if the updating difference is zero.

20. The mechanism of claim 19, further comprising:
a fault rate; and
wherein:
the fault rate is a number from an interval of zero to one indicating how a particular fault is considered as present in the system; and
the fault rate is determined from the fault score.

* * * * *